(12) United States Patent
Harper et al.

(10) Patent No.: US 11,698,935 B2
(45) Date of Patent: **\*Jul. 11, 2023**

(54) SYSTEM AND METHOD FOR COPYING LINKED DOCUMENTS

(71) Applicant: WORKIVA INC., Ames, IA (US)

(72) Inventors: Brett Evan Harper, Ames, IA (US); Katherine Dawn Cissell, Ames, IA (US); Braeden William Young, Sault Ste. Marie (CA); Marco Alfredo Pierucci, Sault Ste. Marie (CA); Nicholas Alexander Cerilli, Sault Ste. Marie (CA)

(73) Assignee: WORKIVA INC., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,812

(22) Filed: Jun. 6, 2022

(65) Prior Publication Data
US 2022/0358170 A1    Nov. 10, 2022

Related U.S. Application Data

(63) Continuation of application No. 17/313,240, filed on May 6, 2021, now Pat. No. 11,354,362.

(51) Int. Cl.
*G06F 3/048* (2013.01)
*G06F 16/93* (2019.01)
(Continued)

(52) U.S. Cl.
CPC ............ *G06F 16/93* (2019.01); *G06F 16/322* (2019.01); *G06F 40/134* (2020.01); *G06F 40/14* (2020.01)

(58) Field of Classification Search
None
See application file for complete search history.

(56) References Cited

U.S. PATENT DOCUMENTS

| 4,807,182 A | 2/1989 | Queen |
| 5,603,021 A | 2/1997 | Spencer et al. |

(Continued)

FOREIGN PATENT DOCUMENTS

WO    2008/107665 A2    9/2008

OTHER PUBLICATIONS

Bewig, "How do you know your spreadsheet is right? Principles, Techniques and Practice of Spreadsheet Style," <http://www.eusprig.org/hdykysir.pdf>, Jul. 28, 2005, 14 pages.

(Continued)

*Primary Examiner* — Maikhanh Nguyen
(74) *Attorney, Agent, or Firm* — Faegre Drinker Biddle & Reath LLP (57) ABSTRACT

A method for maintaining links is described. A document selection is received, including a first destination document containing a first link to linked content. A first source document containing the linked content and not contained within the document selection is identified using the first link. A copy mode is selected, using an intrinsic property associated with the first link, from: a first mode where a second destination document that is a copy of the first destination document is generated and includes a second link to the linked content within the first source document, without copying the first source document, and a second copy mode where i) a second source document that is a copy of the first source document is generated, ii) the second destination document is generated and includes a second link to the linked content within the second source document. The selected copy mode is performed.

20 Claims, 7 Drawing Sheets

(51) Int. Cl.
  *G06F 40/134*  (2020.01)
  *G06F 16/31*  (2019.01)
  *G06F 40/14*  (2020.01)

(56) References Cited

U.S. PATENT DOCUMENTS

| | | | |
|---|---|---|---|
| 5,729,730 A | 3/1998 | Wlaschin et al. |
| 5,758,356 A | 5/1998 | Hara et al. |
| 5,883,623 A | 3/1999 | Cseri |
| 6,057,837 A | 5/2000 | Hatakeda et al. |
| 6,138,130 A | 10/2000 | Adler et al. |
| 6,230,173 B1 | 5/2001 | Ferrel et al. |
| 6,252,605 B1 | 6/2001 | Beesley et al. |
| 6,460,059 B1 | 10/2002 | Wisniewski |
| 6,572,660 B1 | 6/2003 | Okamoto |
| 6,631,385 B2 | 10/2003 | Lee et al. |
| 6,741,998 B2 | 5/2004 | Ruth et al. |
| 6,792,454 B2 | 9/2004 | Nakano et al. |
| 6,848,077 B1 | 1/2005 | McBrearty et al. |
| 6,909,965 B1 | 6/2005 | Beesley et al. |
| 6,948,154 B1 | 9/2005 | Rothermel et al. |
| 7,080,065 B1 | 7/2006 | Kothuri et al. |
| 7,096,422 B2 | 8/2006 | Rothschiller et al. |
| 7,124,362 B2 | 10/2006 | Tischer |
| 7,181,467 B2 | 2/2007 | Kothuri |
| 7,219,108 B2 | 5/2007 | Kothuri et al. |
| 7,249,314 B2 | 7/2007 | Walker et al. |
| 7,424,671 B2 | 9/2008 | Elza et al. |
| 7,496,837 B1 | 2/2009 | Larcheveque et al. |
| 7,496,841 B2 | 2/2009 | Hadfield et al. |
| 7,587,471 B2 | 9/2009 | Yasuda et al. |
| 7,631,255 B2 | 12/2009 | Weise et al. |
| 7,734,714 B2 | 6/2010 | Rogers |
| 7,761,403 B2 | 7/2010 | Witkowski et al. |
| 7,792,847 B2 | 9/2010 | Dickerman et al. |
| 7,809,712 B2 | 10/2010 | Witkowski et al. |
| 7,827,208 B2 | 11/2010 | Bosworth et al. |
| 7,984,371 B2 | 7/2011 | Zdenek |
| 8,015,235 B1 | 9/2011 | Bauer et al. |
| 8,108,464 B1 | 1/2012 | Rochelle et al. |
| 8,307,337 B2 | 11/2012 | Chamieh et al. |
| 8,332,747 B2 | 12/2012 | Carro et al. |
| 8,335,783 B2 | 12/2012 | Milby |
| 8,412,813 B2 | 4/2013 | Carlson et al. |
| 8,423,471 B1 | 4/2013 | Emigh et al. |
| 8,527,865 B2 | 9/2013 | Li et al. |
| 8,555,161 B2 | 10/2013 | Parker |
| 8,595,620 B2 | 11/2013 | Larsen et al. |
| 8,595,750 B2 | 11/2013 | Agarwal et al. |
| 8,607,207 B2 | 12/2013 | Chamieh et al. |
| 8,645,929 B2 | 2/2014 | Chamieh et al. |
| 8,656,290 B1 | 2/2014 | Greenspan et al. |
| 8,707,156 B2 | 4/2014 | Xue et al. |
| 8,745,483 B2 | 6/2014 | Chavoustie et al. |
| 8,825,594 B2 | 9/2014 | Skaria et al. |
| 8,849,834 B2 | 9/2014 | Milby |
| 8,856,234 B2 | 10/2014 | Kluin et al. |
| 8,869,020 B2 | 10/2014 | Daga |
| 8,954,457 B2 | 2/2015 | Fablet et al. |
| 9,015,301 B2 | 4/2015 | Redlich et al. |
| 9,152,686 B2 | 10/2015 | Whitehead et al. |
| 9,292,366 B2 | 3/2016 | Carro et al. |
| 9,292,482 B1 | 3/2016 | Thiesen et al. |
| 9,292,507 B2 | 3/2016 | Calkowski et al. |
| 9,552,343 B2 | 1/2017 | Thiesen et al. |
| 9,613,055 B2 | 4/2017 | Tyercha et al. |
| 9,720,931 B2 | 8/2017 | Tyercha et al. |
| 10,133,708 B2 | 11/2018 | Carro et al. |
| 10,140,269 B2 | 11/2018 | Vogel et al. |
| 10,147,054 B2 | 12/2018 | Dayon et al. |
| 10,223,340 B2 | 3/2019 | Soni |
| 10,325,014 B2 | 6/2019 | Nelson et al. |
| 10,331,776 B2 | 6/2019 | Thiesen et al. |
| 10,635,744 B2 | 4/2020 | Beth et al. |
| 10,878,182 B2 | 12/2020 | Thiesen et al. |
| 10,902,185 B1 | 1/2021 | Cairns |
| 10,936,808 B2 | 3/2021 | Soni |
| 10,956,445 B1 | 3/2021 | Hurst et al. |
| 11,048,885 B2 | 6/2021 | Liu et al. |
| 2002/0049697 A1 | 4/2002 | Nakano et al. |
| 2002/0065848 A1 | 5/2002 | Walker et al. |
| 2002/0103825 A1 | 8/2002 | Bauchot |
| 2003/0028545 A1 | 2/2003 | Wang et al. |
| 2003/0079157 A1 | 4/2003 | Lee et al. |
| 2003/0112273 A1 | 6/2003 | Hadfield et al. |
| 2003/0121008 A1 | 6/2003 | Tischer |
| 2003/0128243 A1 | 7/2003 | Okamoto et al. |
| 2004/0024752 A1 | 2/2004 | Manber et al. |
| 2004/0133567 A1 | 7/2004 | Witkowski et al. |
| 2004/0172616 A1 | 9/2004 | Rothschiller et al. |
| 2004/0181543 A1 | 9/2004 | Wu et al. |
| 2004/0193615 A1 | 9/2004 | Kothuri |
| 2005/0132070 A1 | 6/2005 | Redlich et al. |
| 2005/0149851 A1 | 7/2005 | Mittal |
| 2006/0044307 A1 | 3/2006 | Song |
| 2006/0080594 A1 | 4/2006 | Chavoustie et al. |
| 2006/0085386 A1 | 4/2006 | Thanu et al. |
| 2006/0101324 A1 | 5/2006 | Goldberg et al. |
| 2006/0143607 A1 | 6/2006 | Morris |
| 2006/0224946 A1 | 10/2006 | Barrett et al. |
| 2006/0271868 A1 | 11/2006 | Sullivan et al. |
| 2007/0033519 A1 | 2/2007 | Zdenek |
| 2007/0055989 A1 | 3/2007 | Shanks et al. |
| 2007/0124281 A1 | 5/2007 | Cowan |
| 2007/0136698 A1 | 6/2007 | Trujillo et al. |
| 2007/0186157 A1 | 8/2007 | Walker et al. |
| 2007/0219956 A1 | 9/2007 | Milton |
| 2007/0220415 A1 | 9/2007 | Cheng et al. |
| 2007/0245409 A1 | 10/2007 | Harris et al. |
| 2008/0005164 A1 | 1/2008 | Yee et al. |
| 2008/0114720 A1 | 5/2008 | Smith et al. |
| 2008/0134138 A1 | 6/2008 | Chamieh et al. |
| 2008/0148140 A1 | 6/2008 | Nakano |
| 2008/0162532 A1 | 7/2008 | Daga |
| 2008/0177825 A1 | 7/2008 | Dubinko et al. |
| 2008/0300864 A1 | 12/2008 | Smith |
| 2008/0306983 A1 | 12/2008 | Singh |
| 2009/0044283 A1 | 2/2009 | Yoshihama |
| 2009/0063949 A1 | 3/2009 | Duan |
| 2009/0094242 A1 | 4/2009 | Lo et al. |
| 2009/0100324 A1 | 4/2009 | Aureglia et al. |
| 2009/0150426 A1 | 6/2009 | Cannon et al. |
| 2009/0182763 A1 | 7/2009 | Hawking |
| 2009/0182837 A1 | 7/2009 | Rogers |
| 2009/0199090 A1 | 8/2009 | Poston et al. |
| 2009/0292730 A1 | 11/2009 | Li et al. |
| 2009/0327213 A1 | 12/2009 | Choudhary |
| 2010/0058176 A1 | 3/2010 | Carro et al. |
| 2010/0077331 A1 | 3/2010 | Bargh et al. |
| 2010/0257439 A1 | 10/2010 | Xue et al. |
| 2011/0106795 A1 | 5/2011 | Maim |
| 2011/0202968 A1 | 8/2011 | Nurmi |
| 2011/0271179 A1 | 11/2011 | Jasko et al. |
| 2012/0030563 A1 | 2/2012 | Lemonik et al. |
| 2012/0136874 A1 | 5/2012 | Milby |
| 2012/0137308 A1 | 5/2012 | Agarwal et al. |
| 2012/0151312 A1 | 6/2012 | Clee et al. |
| 2012/0173612 A1 | 7/2012 | Vegesna-Venkata et al. |
| 2012/0330984 A1 | 12/2012 | Fablet et al. |
| 2012/0331379 A1 | 12/2012 | Carro et al. |
| 2013/0232475 A1 | 9/2013 | Chamieh et al. |
| 2014/0047327 A1 | 2/2014 | Larsen et al. |
| 2014/0082470 A1 | 3/2014 | Trebas et al. |
| 2014/0129645 A1 | 5/2014 | Mo |
| 2014/0181016 A1 | 6/2014 | Whitehead et al. |
| 2014/0188544 A1 | 7/2014 | Senescu |
| 2014/0245257 A1 | 8/2014 | Kusmer et al. |
| 2014/0281870 A1 | 9/2014 | Vogel et al. |
| 2014/0282101 A1 | 9/2014 | Beechuk et al. |
| 2015/0052100 A1 | 2/2015 | Calkowski et al. |
| 2015/0058449 A1 | 2/2015 | Garg et al. |
| 2015/0100304 A1 | 4/2015 | Tealdi et al. |
| 2015/0100594 A1 | 4/2015 | Hess et al. |
| 2015/0199270 A1 | 7/2015 | Day-Richter et al. |

(56) References Cited

U.S. PATENT DOCUMENTS

| | | | |
|---|---|---|---|
| 2015/0324373 | A1 | 11/2015 | Tyercha et al. |
| 2015/0324399 | A1 | 11/2015 | Tyercha et al. |
| 2016/0041963 | A1 | 2/2016 | Coblenz et al. |
| 2016/0162128 | A1 | 6/2016 | Hansen et al. |
| 2016/0162461 | A1 | 6/2016 | Simon et al. |
| 2016/0239488 | A1 | 8/2016 | Aguilon et al. |
| 2016/0344667 | A1 | 11/2016 | Lane et al. |
| 2016/0378737 | A1 | 12/2016 | Keslin et al. |
| 2017/0132188 | A1 | 5/2017 | Thiesen et al. |
| 2017/0220546 | A1 | 8/2017 | Codrington et al. |
| 2017/0308511 | A1 | 10/2017 | Beth et al. |
| 2018/0165260 | A1 | 6/2018 | Soni |
| 2019/0102370 | A1 | 4/2019 | Nelson et al. |
| 2020/0250383 | A1 | 8/2020 | Cheng |
| 2021/0064817 | A1 | 3/2021 | Deering et al. |
| 2021/0081605 | A1 | 3/2021 | Smith et al. |

OTHER PUBLICATIONS

Burnett et al., "Testing Homogeneous Spreadsheet Grids with the "What You See Is What You Test" Methodology," IEEE Transactions on Software Engineering, Jun. 2002, vol. 28, No. 6, pp. 576-594.

Extendoffice, "How to insert multiple hyperlinks in a cell in Excel?", ExtendOffice.com, <https://web.archive.org/web/20150409040726/https://www.extendoffice.com/documents/excel/916-excel-insert-mulitple-hyperlinks.html>, 2015, 3 pages.

Grishchenko, "Deep Hypertext with Embedded Revision Control Implemented in regular Expressions," Proceedings of the 6th International Symposium on Wikis and Open Collaboration, ACM, 2010, 10 pages.

Grishchenko et al., "Referencing within evolving hypertext," Second international Workshop on Dynamic and Adaptive Hypertext, 2011, 12 pages.

Guttman, "R-Trees: A Dynamic Index Structure for Spatial Searching," ACM, 1984, pp. 47-57.

Ignat et al., "Tree-based model algorithm for maintaining consistency in real-time collaborative editing systems," The Fourth International Workshop on Collaborative Editing Systems, CSCW 2002, New Orleans, USA, Nov. 2002, 8 pages.

Kamel et al., "Hilbert R-tree: An Improved R-tree Using Fractals," PVLDB '94 Proceedings of the 20th International Conference on Very Large Data Bases, Sep. 12-15, 1994, Morgan Kaufman Publishers Inc., San Francisco, CA, USA, 1994, pp. 500-509.

Kankuzi, "A Dynamic Graph-based Visualization for Spreadsheets," University of Bostwana, Faculty of Science, Department of Computer Science, <http://www.researchgate.net/profile/Yirsaw_Ayalew2/publication/234808991_A_dynamic_graph-based_visualization_for_spreadsheets/links/00b7d51a9b5169d566000000.pdf>, Jun. 2008, 121 pages.

Kankuzi et al., "An End-User Oriented Graph-Based Visualization for Spreadsheets," Proceedings of the 4th International Workshop on End-user Software Engineering, WEUSE '08, May 12, 2008, Leipzig, Germany, ACM, 2008, pp. 86-90.

Microsoft, "Create an external reference (link) to a cell range in another workbook," Excel for Microsoft 365, Excel 2019, Excel 2016, Excel 2013, Excel 2010 Support Office, 2020, retrieved from internet at <https://support.office.com/en-us/article/create-an-external-reference-link-to-a-cell-range-in-another-workbook-c98d1803-dd75-4668-ac6a-d7cca2a9b95f> on May 5, 2020, 8 pages.

Microsoft, "Create or change a cell reference," Excel for Microsoft 365, Excel for the web, Excel 2019, Excel 2016 Support Office, 2020, retrieved from internet at <https://support.office.com/en-us/article/create-or-change-a-cell-reference-c7b8b95d-c594-4488-947e-c835903cebaa> on May 5, 2020, 8 pages.

Rothermel et al., "A Methodology for Testing Spreadsheets," ACM Transactions on Software Engineering and Methodology, Jan. 2001, vol. 10, No. 1, pp. 110-147.

Sewall et al., "PALM: Parallel Architecture-Friendly Latch-Free Modifications to B+ Trees on Many-Core Processors," Proc. VLDB Endowment, 2011, pp. 795-806.

Stanescu et al., "Using R-trees in content-based region query with spatial bounds," Seventh International Symposium on Symbolic and Numeric Algorithms for Scientific Computing (SYNASC'05), Timisoara, Romania, 2005, 7 pages.

Tang et al., "Novel DR-tree index based on the diagonal line of MBR," 2012 8th International Wireless Communications and Mobile Computing Conference (IWCMC), Limassol, Cyprus, 2012, pp. 574-579.

Yang et al., "Performance of R-Tree with Slim-Down and Reinsertion Algorithm," 2010 International Conference on Signal Acquisition and Processing, Bangalore, India, 2010, pp. 291-294.

FIG. 6

SYSTEM AND METHOD FOR COPYING LINKED DOCUMENTS

CROSS-REFERENCE TO RELATED APPLICATIONS

This application is a continuation application of U.S. patent application Ser. No. 17/313,240, filed May 6, 2021, now U.S. Pat. No. 11,354,362, which is incorporated herein by reference in its entirety. This application is also related to U.S. application Ser. No. 16/871,512, filed May 11, 2020, which is incorporated herein by reference in its entirety.

TECHNICAL FIELD

The present disclosure relates generally to electronic document management and, more particularly, to a data storage and retrieval system and method for copying documents having interconnected links.

BACKGROUND

An electronic document typically includes content such as tables, images, text, etc. When that content is to be used in several different documents, it is often cumbersome and error-prone to copy the data among the different locations, for example, from a source document to one or more derivative or "destination" documents. In some scenarios, instead of copying the content in a source document to a new location, it is beneficial to insert a link to the content and retrieve that content as it is needed. For example, a destination element or link is inserted into a destination document. The destination element is used to link content from a source element in the source document so that when the destination document is displayed, the most up-to-date version of the content from the source document is obtained and displayed. However, when a user wishes to copy a destination document containing a link to another source document, a simple "copy" action may not adequately maintain the links so that subsequent changes in the source document are propagated to the copy of the target document.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

In systems configured to maintain multiple documents with various dependencies on each other, the dependencies create challenges for copying some documents. In some scenarios, creating a copy of a destination document that includes content linked from a source document allows for either creating a copy of the source document itself (a "deep" copy, as described below), or creating a new link to the source document within the newly created copy of the destination document (a "shallow" copy, as described below). In various embodiments, a copy mode for the source document is selected using an intrinsic property associated with the link. In some embodiments, a linked files report is generated to identify dependencies among documents that will be affected by a copy operation. In an embodiment, the linked files report identifies source documents that will be copied and source documents that will not be copied but instead be referenced by new destination documents.

Figure 1:
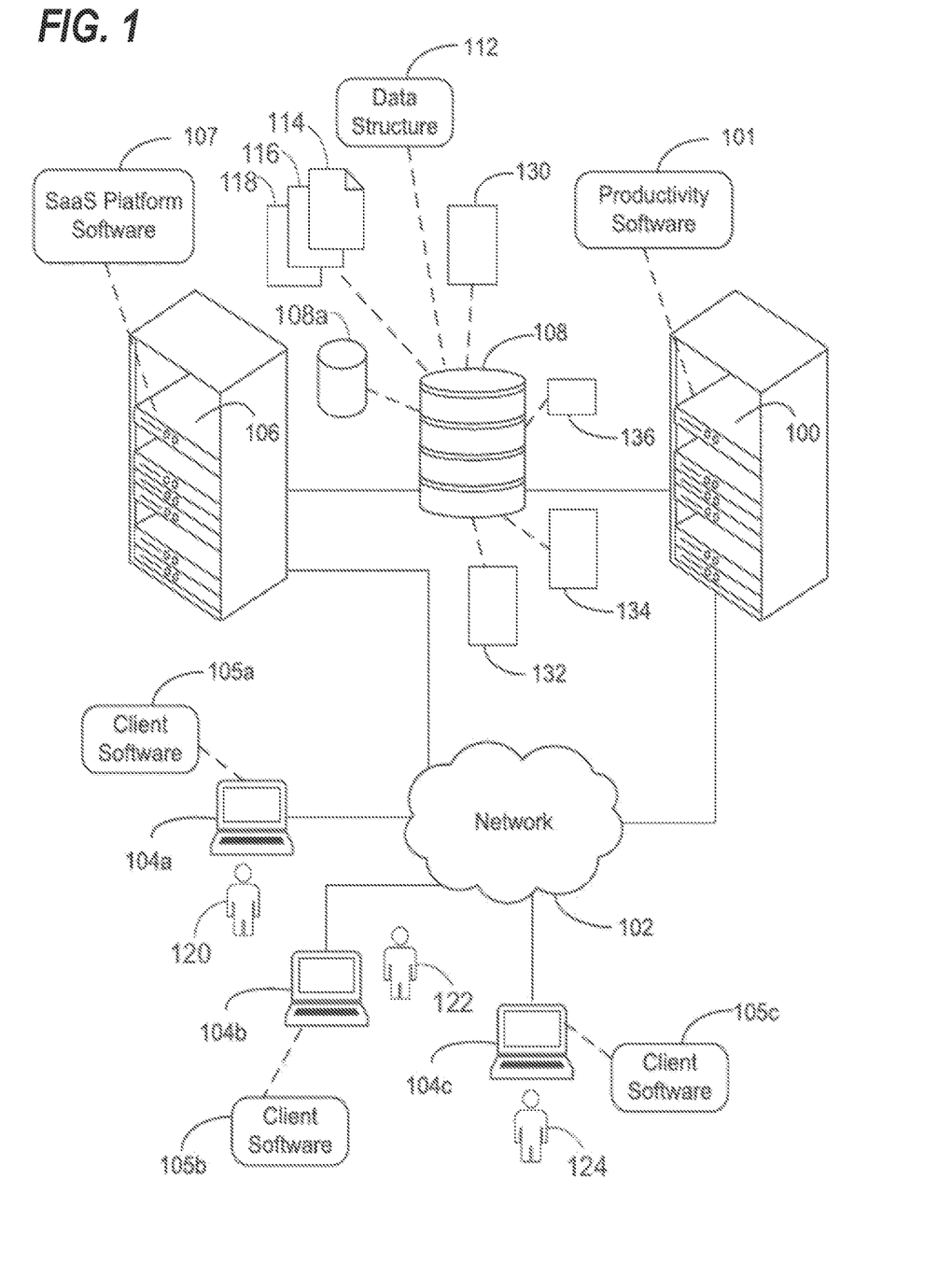
FIG. 1 is an example of a networking environment in which various embodiments of the disclosure may be implemented, according to an embodiment.

Turning to FIG. 1, an example of a computer networking environment in which various embodiments of the disclosure may be implemented is shown. A first computing device 100 is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104a, a third computing device 104b, a fourth computing device 104c, and a fifth computing device 106. The fifth computing device 106 is communicatively linked to a media storage device 108 (e.g., a redundant array of independent disks). For the sake of example, it is assumed that a first user 120 operates the second computing device 104a, a second user 122 operates the third computing device 104b, and a third user 124 operates the fourth computing device 104c. Each of the computing devices 104a, 104b, and 104c executes client software (reference numerals 105a, 105b, and 105c, respectively). One possible implementation of the client software is a web browser.

Residing within the media storage device 108 is a database 108a containing multiple documents, three of which are depicted in FIG. 1: a first document 114, a second document 116, and a third document 118. The first computing device 100 and the fifth computing device 106 are depicted as rack-mounted servers, while the second, third, and fourth computing devices 104a, 104b, and 104c are depicted as a notebook computers. However, the computing devices depicted in FIG. 1 are merely representative. Other possible implementations of a computing device include a desktop computer, a tablet computing, and a smartphone. Furthermore, although the first, second, and third documents 114, 116, and 118 are depicted as being stored in a single device, they may, in fact, be stored on multiple storage devices (e.g., sharded into multiple physical chunks) of a cloud storage service. Finally, there may be more than or fewer than the first, second, and third documents 114, 116, and 118 residing on the media storage device 108.

In various embodiments, at least some documents are stored using a suitable data structure configured to maintain links and references between cells, tables, paragraphs, sections, or other suitable portions of a document. In an embodiment, documents are stored using an RTree data structure. In another embodiment, documents are stored using a causal tree data structure.

In an embodiment, the system includes a computing device that configures the computer memory according to a causal tree (a type of logic tree) representing a structure of a document. The computer memory may be internal to or external to the computing device. Causal tree structures are useful representations of how content and metadata associated with the content are organized. For example, a document may be represented by a single causal tree structure or a bounded set of causal tree structures. The causal tree structure is useful in efficiently tracking and storing changes made in the document. A typical causal tree structure includes nodes of the editing instructions in the document, and each editing instruction has a unique identifier or ID. The editing instructions include, for example, text characters, insertion of text characters, deletion of text characters, formatting instructions, copy and paste, cut and paste, etc. In other words, a causal tree structure is a representation of all the instructions (regardless of type) that compose a document. The causal tree structure starts with a root node and a collection of observation instances, from which all other instruction nodes branch. Except for the root node and observations, each editing instruction in the document is caused by whichever editing instruction that came before it. Every editing instruction is aware of the ID of its parent instruction, i.e., the instruction that "caused" it. In an embodiment, each instruction (other than the root node and observations) in the document may be represented as a 3-tuple: ID (ID of the instruction), CauseID (ID of the parent instruction), and Value (value of the instruction). Observations have a 3-tuple: ID (ID of the instruction), Start ID (ID of the first character in a range), and Stop ID (ID of character immediately after the last character in a range unless the same as the Start ID which indicates only a single character is to be observed). Additional instructions may be added to an observation to provide additional information or to modify the range being observed. Examples of observations are discussed in U.S. patent application Ser. No. 16/871,512.

In an embodiment, the system includes a computing device that configures the computer memory according to an RTree (a type of logic tree) representing a structure of a spreadsheet or other document. The computer memory may be internal to or external to the computing device. In an embodiment, the RTree has a plurality of nodes, at least some of which contain one or more minimum bounding rectangles. Each minimum bounding rectangle ("MBR") encompasses cells of the spreadsheet from a different one of a plurality of columns of the spreadsheet, but does not encompass cells of any of the other columns of the plurality of columns. A node of the RTree may hold multiple MBRs or a single MBR.

For convenient reference, the first computing device 100 will also be referred to as a "productivity server 100" and the fifth computing device 106 will be also be referred to as a "database server 106." Although depicted in FIG. 1 as separate devices, in some embodiments, the functionality of the productivity server 100 and the database server 106 are on the same device. The productivity server 100 executes productivity software 101 to provide document collaboration services. The database server 106 executes Software-as-a-Service ("SaaS") platform software 107 to provide database services to the productivity software 101, such as maintaining the contents of the database 108a and providing a programming platform for various processes launched by the productivity software (e.g., to manipulate, store, and retrieve documents and other information from the database 108a). Under the control of the productivity software 101, the productivity server 100 interacts with the database server 106 (which operates under the control of the SaaS platform software 107) and the computing devices 104a, 104b, and 104c (also referred to as "client devices") to allow the computing devices to access the first document 114, the second document 116, and the third document 118 so that the first user 120, the second user 122, and the third user 124 can collaborate in editing the documents (e.g., moving sections around in a particular document).

In an embodiment, documents maintained on the media storage device 108 may be organized into sections, with each section (e.g., the contents of the section) being maintained in its own separate data structure referred to as a "section entity." For example, the first document 114 in FIG. 1 has a first section represented by a first section entity 130, a second section represented by a second section entity 132, and a third section represented by a third section entity 134. The productivity software 101 uses an outline entity 136 (also stored on the media storage device) to determine how the sections are organized.

Figure 2:
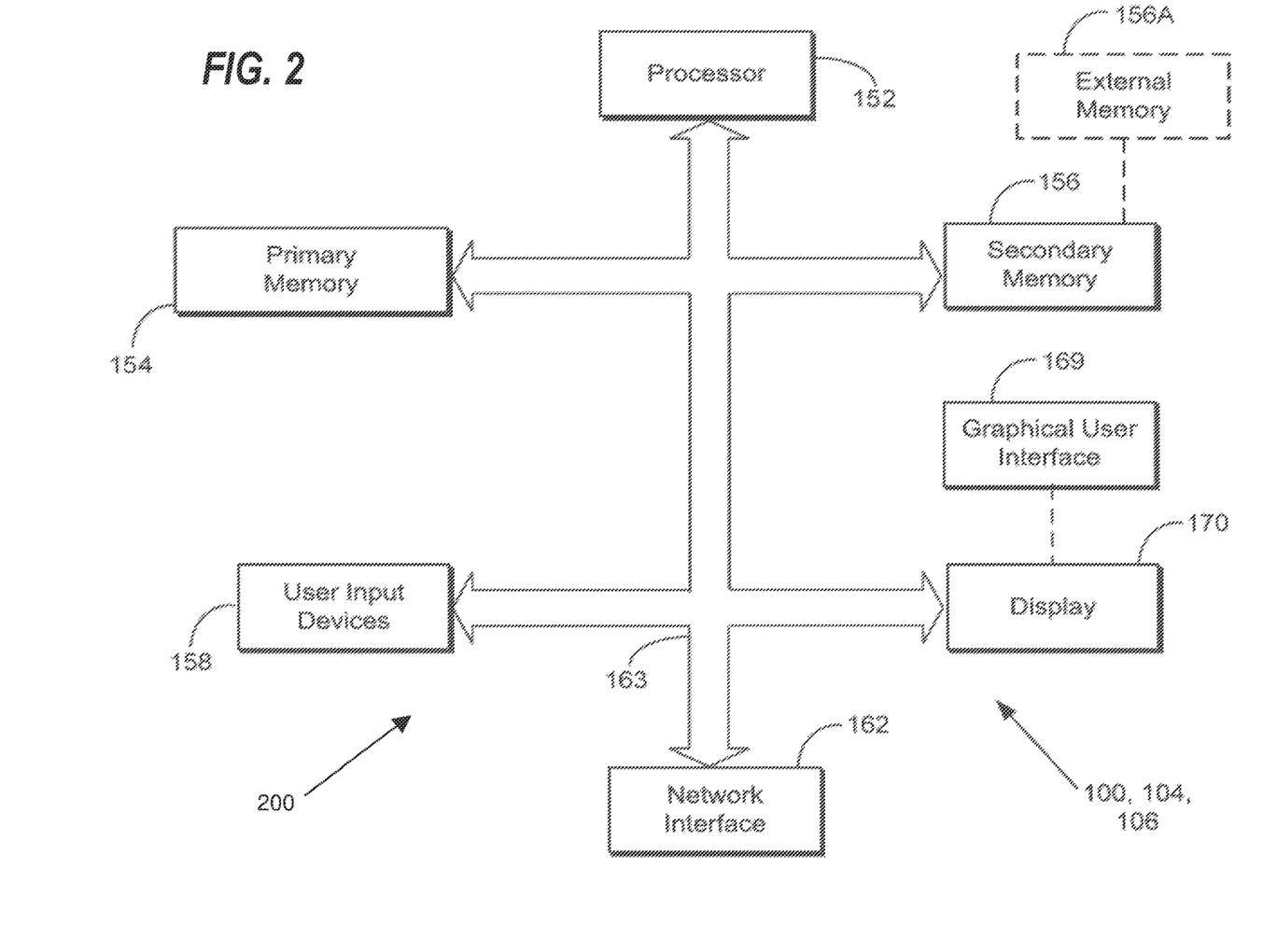
FIG. 2 is a block diagram of a computing device, according to an embodiment.

FIG. 2 is a block diagram of a computing device 200, according to an embodiment. One or more of the computing devices of FIG. 1 (including the media storage device 108) have the general architecture shown in FIG. 2, in various embodiments. The device depicted in FIG. 2 includes a processor 152 (e.g., a microprocessor, controller, or application-specific integrated circuit), a primary memory 154 (e.g., volatile memory, random-access memory), a secondary memory 156 (e.g., non-volatile memory, solid state drive, hard disk drive), user input devices 158 (e.g., a keyboard, mouse, or touchscreen), a display 160 (e.g., an organic, light-emitting diode display), and a network interface 162 (which may be wired or wireless). The memories 154 and 156 store instructions and data. The processor 152 executes the instructions and uses the data to carry out various procedures including, in some embodiments, the methods described herein.

Each of the elements of FIG. 2 is communicatively linked to one or more other elements via one or more data pathways 163. Possible implementations of the data pathways 163 include wires, conductive pathways on a microchip, and wireless connections. In an embodiment, the processor 152 is one of multiple processors in the computing device, each of which is capable of executing one or more separate threads. In an embodiment, the processor 152 communicates with other processors external to the computing device in order to initiate the execution of different threads on those other processors.

The term "local memory" as used herein refers to one or both of the memories 154 and 156 (i.e., memory accessible by the processor 152 within the computing device). In some embodiments, the secondary memory 156 is implemented as, or supplemented by an external memory 156A. The media storage device 108 is a possible implementation of the external memory 156A. The processor 152 executes the instructions and uses the data to carry out various procedures including, in some embodiments, the methods described herein, including displaying a graphical user interface 169. The graphical user interface 169 is, according to one embodiment, software that the processor 152 executes to display a report on the display device 160, and which permits a user to make inputs into the report via the user input devices 168.

The computing devices of FIG. 1 (i.e., the processor 152 of each of the computing devices) are able to communicate with other devices of FIG. 1 via the network interface 162 over the network 152. In an embodiment, this communication takes place via a user interface that the productivity server 150 provides to the computing devices 154a, 154b, and 154c. The specific nature of the user interface and what the user interface shows at any given time may vary depending on what the user has chosen to view. Also, multiple users may interact with different instances of the user interface on different devices. In some embodiments, the productivity server 150 carries out calculations to determine how content is to be rendered on a computing device, generates rendering instructions based on those calculations, and transmits those rendering instructions to the computing device. Using the received instructions, the computing device renders the content on a display. In other embodiments, the productivity server 150 transmits instructions regarding an asset to a computing device. In carrying out the received instructions, the computing device performs the appropriate calculations locally to render the content of the asset on a display.

Figure 3A:
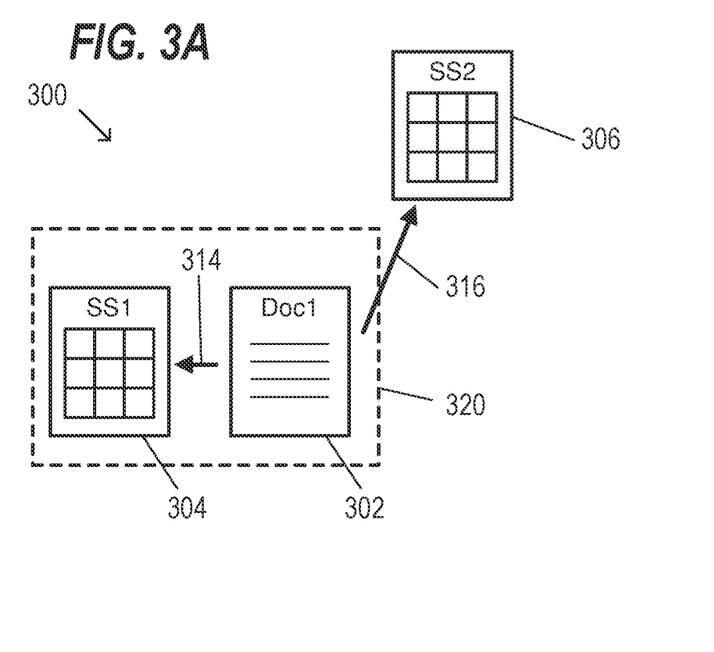
FIG. 3A is a block diagram of an example workspace that includes selected documents to be copied using the computing device of FIG. 2, according to an embodiment.

FIG. 3A is a block diagram of an example workspace 300 that includes selected documents to be copied using the computing device of FIG. 2, according to an embodiment. The workspace 300 represents a shared repository of a plurality of documents. In some scenarios, the repository is associated with a corporation, business unit, user group, or other entity. The plurality of documents may be of the same or different types in various embodiments, for example, spreadsheet documents, text documents, presentation documents, or other suitable document types. In an embodiment, the workspace 300 is configured to store the plurality of documents (i.e., documents 114, 116, and 118), or suitable data structures associated with the documents, in the database 108a. In some embodiments, documents are implemented as separate files, such as word processing files (e.g., files with extension ".doc", ".docx", ".odt", ".rtf"), spreadsheet documents (e.g., files with extension ".xls", ".xlsx", ".ods"), presentation documents (e.g., files with extension ".ppt", ".pptx", ".odp", ".key"), or other suitable files that may be stored in, for example, file folders on the media storage device 108 or within the database 108a. In some embodiments, a document may be implemented within the database 108a, for example, as one or more database entries that are retrieved and displayed as a single document when requested by a user. In an embodiment, for example, a document is stored as separate portions (e.g., paragraphs, sections, sentences, etc.) with each portion stored as one or more separate database entries.

In the embodiment shown in FIG. 3A, the workspace 300 includes a first document 302 (a text document, Doc1), a second document 304 (a spreadsheet document, SS1), and a third document 306 (a spreadsheet document, SS2). In other embodiments, a workspace may include additional documents (e.g., dozens or even hundreds of documents). At least some of the documents within the workspace 300 include one or more links. As used herein, a link is a reference, pointer, or data structure that refers to a location where linked content is present or where the linked content should be displayed, while the linked content is a set of content, for example, a set of one or more characters or numbers, a set of one or more sentences, a set of one or more paragraphs, a set of one or more cells within a spreadsheet, a set of one or more images, or various combinations thereof. In other words, the linked content is displayed both in the source document and in the destination document with the linked content being obtained from the source document when displayed at the destination document. In an embodiment, a source link is a link within a destination document that indicates a location or source element for the linked content and a destination link is a link within a source document that indicates a destination element at which the linked content should be displayed. In some embodiments, the destination link indicates a plurality of destination elements, for example, where a single source element is used within multiple documents (or within multiple elements within those documents). In other embodiments, the source document contains separate destination links for each destination document associated with the linked content. In various embodiments, a source element or destination element identifies a location for data, for example, a document ID that identifies a particular document, a section ID that identifies a particular section within that document, and a cell ID or text span ID that identifies a particular element (e.g., cell or text span) within the particular section. In some embodiments, the destination links are omitted and an external linking system (not shown) is configured to monitor changes to source locations and destination locations.

In the embodiment shown in FIG. 3A, the first document 302 has a link 314 to the second document 304 and also a link 316 to the third document 306. In FIG. 3A, a dependency arrow (i.e., elements 314, 316) represents a destination element at an origin of the arrow with an arrow head pointing to a source element. In other words, both the second document 304 and the third document 306 are "source" documents for the first document 302 (a "destination" document). In some embodiments, using these links, the productivity server 100 (or other suitable device) updates destination documents in response to a change being made to the corresponding source element or document.

In FIG. 3A, a user has selected one or more documents 320 within the workspace 300 to be copied. The selected documents 320 include the first document 302 and the second document 304, but not the third document 306. In some embodiments, the user selects the documents 320 using a user interface (not shown) that provides a list of available documents within the workspace 300 and the user requests the copy operation by selection from a menu (e.g., right-clicking to obtain a context menu or clicking a drop-down menu). In other embodiments, the user selects the documents 320 by selecting one or more documents from a hierarchy of documents and the productivity server 100 automatically selects additional documents that are below the selected documents in the hierarchy.

When creating a copy of the first document, the content contained therein includes both direct content that is directly contained in the first document 302 and indirect content, which is linked from the third document 306. The selected documents are referred to as "direct" documents or destination documents, while documents that have not been selected by the user but have content that is represented within the direct documents are referred to as "indirect" documents or source documents. In various embodiments described herein, in response to a request for a copy from the user, instead of copying only the direct documents or copying both the direct and indirect documents, the productivity server 100 is configured to perform a "shallow" copy, where copies are made of the direct documents, but the indirect documents are modified to refer to the new copies of the direct documents instead of being copied themselves. In this way, additional copies of the indirect documents are not created, which improves the efficiency of the copy operation and reduces storage requirements for the workspace 300. This is in contrast to a "full" copy or "deep" copy, where copies are made of each direct file and indirect file. In some scenarios, the shallow copy is preferred for a source document that is static, e.g., unlikely to have its content changed during the copy or after the copy has been performed. This has the added benefit of minimizing content duplication and long-term maintenance burden on common linked content.

Although only three documents are shown in FIG. 3A, in other embodiments the workspace 300 includes dozens, hundreds, or thousands of documents where some documents may have no links, some documents may have source links to other documents, some documents may have destination links to other documents, and some documents may have both source links and destination links to other documents. As discussed above, in some embodiments, the destination links are omitted.

Figure 3B:
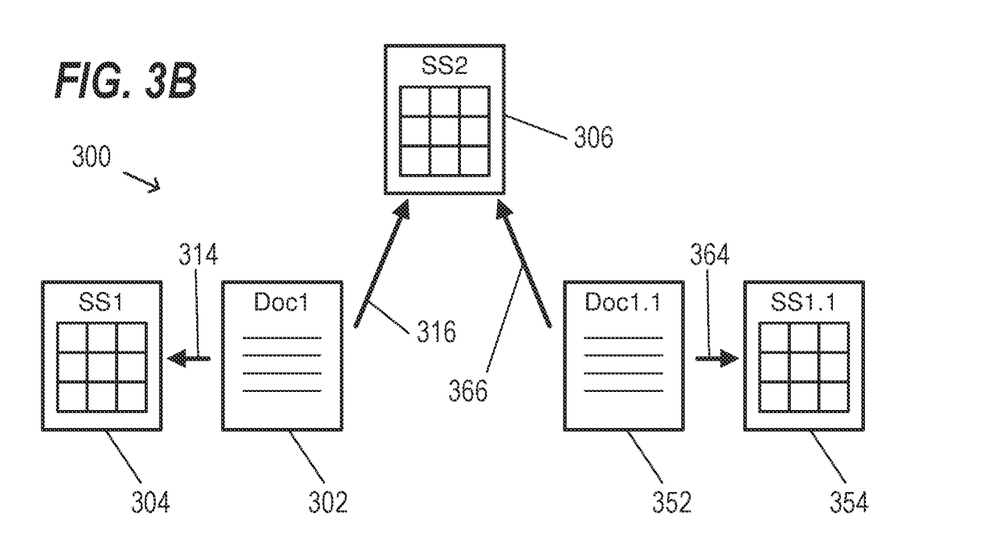
FIG. 3B is a block diagram of the workspace of FIG. 3A after the copy operation has been performed, according to an embodiment.

FIG. 3B is a block diagram of the workspace 300 of FIG. 3A after the copy operation has been performed, according to an embodiment. In FIG. 3B, a new fourth document 352 (text document) has been created as a copy of the first document 302, and a new fifth document 354 (spreadsheet document) has been created as a copy of the second document 304. When copying the first document 302 and second document 304, the productivity server 100 creates a link 364 to the fifth document 354 within the fourth document 352 (i.e., a link within the fourth document 352 that references the fifth document 354 and optionally a destination link within the fifth document 354 that references the fourth document 352), analogous to the link 314 between the first and second documents.

In addition to creating the link 364, the productivity server 100 creates a link 366 to the third document 306 within the fourth document 352. The link 366 is analogous to the link 316 and includes i) a source link within the fourth document 352 that references the third document 306, and ii) a destination link within the third document 306 that references the fourth document 352. In some embodiments, the productivity server 100 modifies an existing destination link within the source document (i.e., the third document 306) to include an additional reference to the corresponding destination element within the destination document (i.e., the fourth document 352). In other embodiments, the productivity server 100 creates a new destination link within the source document to include the reference to the corresponding destination element within the destination document. After the copy operation has completed, the productivity server 100 has generated copies of the direct documents within the document selection (documents 352 and 354) and, when applicable, modified the indirect documents (document 306) to reference the generated copies, in an embodiment.

Figure 4:
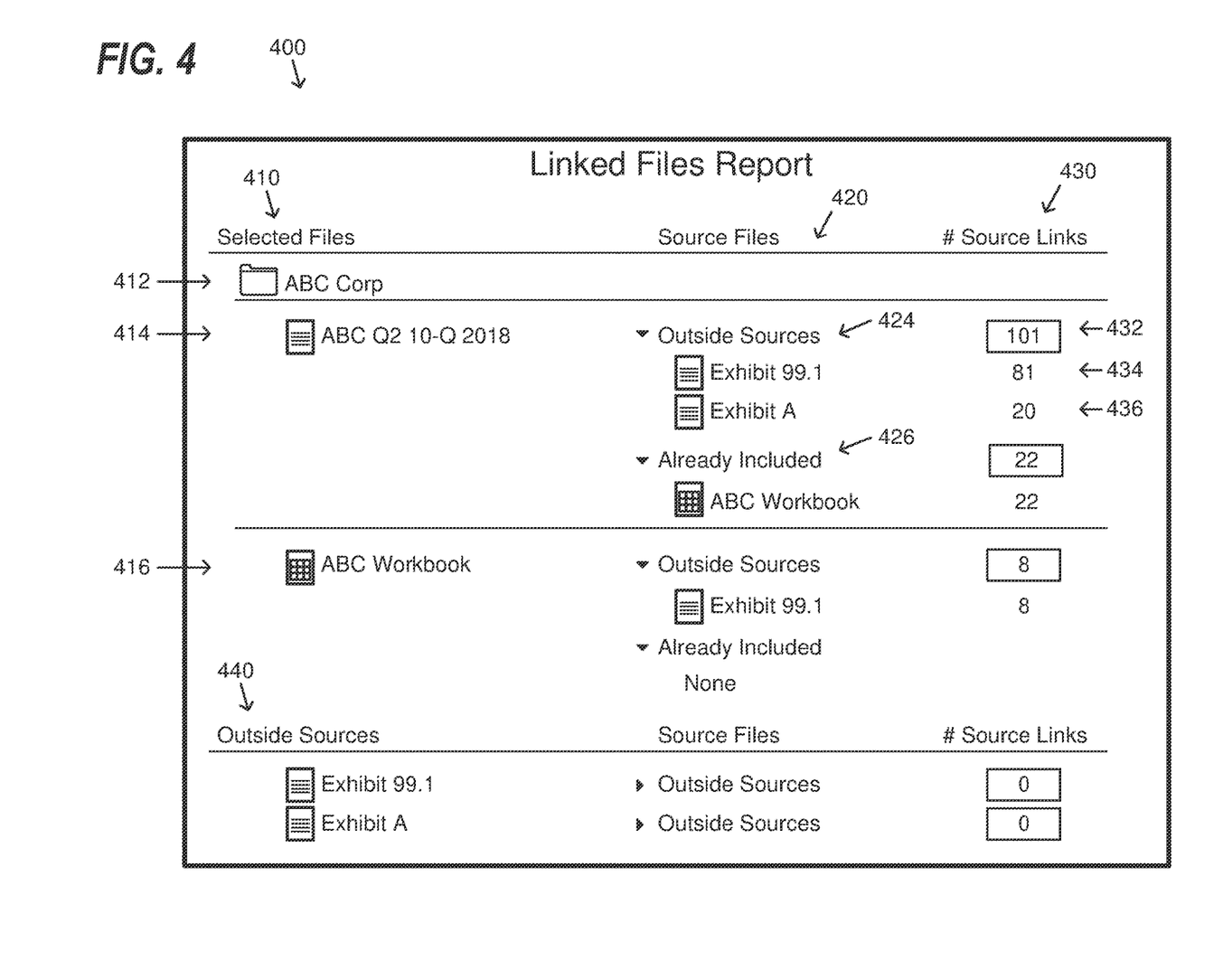
FIG. 4 is a diagram of an example linked files report that identifies documents that will be affected by a copy operation, according to an embodiment.

FIG. 4 is a diagram of an example linked files report 400 that identifies documents which would be affected by a copy operation, according to an embodiment. As described above, the user selects documents to be copied (e.g., documents 320), but may be unaware of which source documents are referenced by the selected documents. In some embodiments, the productivity server 100 generates the linked files report 400 to identify and display which direct documents and indirect documents are affected, along with additional information related to the copy operation. In an embodiment, for example, the linked files report 400 is a human-readable report of the relationship among the different files that would be copied, or modified by the copy operation, and provides a visual depiction of the web of documents that would be traversed as part of the copy operation.

In an embodiment, the linked files report 400 is generated before the copy operation is performed so that the user may add or remove documents from the selected documents 320, change parameters for the copy operation (e.g., whether a shallow copy or full copy is performed), or take another suitable action.

The linked files report 400 includes a listing 410 of selected files, a listing 420 of source files for those selected files, a source link count 430, and a listing 440 of outside sources. The listing 410 of selected files identifies the folders, containers, workspaces, or documents that have been directly selected by the user. In the embodiment shown in FIG. 4, the listing 410 is organized in a hierarchy with a selected top-level folder 412 ("ABC Corp") that contains a first document 414 ("ABC Q2 10-Q 2018") and a second document 416 ("ABC Workbook"). In an embodiment, the productivity server 100 organizes the hierarchy with documents having the most number of source links at the top of the hierarchy. In another embodiment, the productivity server 100 organizes the hierarchy with documents having the most number of source documents at the top of the hierarchy.

The listing 420 of source files identifies source documents for the documents within the listing 410 of selected files. In the embodiment shown in FIG. 4, the first document 414 is a destination document for a link to a third document ("Exhibit 99.1"), a link to a fourth document ("Exhibit A"), and a link to the second document 416 ("ABC Workbook"). In some scenarios, the productivity server 100 separates the source documents into different groups based on whether they have been selected to be copied during the copy operation (i.e., documents that are "already included" 426) or merely updated with links ("outside sources" 424). The listing of outside sources 440 is a combined list of the source files 420 that are not included in the selected files 410 for all of the selected files 410.

The source link count 430 indicates a total number of source links 432 and a number of source links for each source document corresponding to a destination document, in some embodiments. For example, the first document 414 includes 81 links to the "Exhibit 99.1" source document 434 and 20 links to the "Exhibit A" source document 436, so the total number of links 432 is 101. Accordingly, the source link count 430 provides an indication of how strongly a destination document is coupled to a particular source document. In some scenarios, a user may wish to select an outside source (e.g., Exhibit 99.1) so that it is included in the selected documents 410 and copied (e.g., deep copied), instead of merely having the newly created copies link to the selected document (e.g., shallow copied), when the number of source links reaches a suitable threshold (e.g., 50 links). In other words, the user may wish to move the source document 434 from the outside sources 440 to the selected files 410. In an embodiment, the productivity server 100 automatically suggests inclusion of source documents that meet the threshold number of links when generating or displaying the linked files report. In some embodiments, the number of source links is an intrinsic property that the productivity server 100 uses to automatically determine whether to shallow copy or deep copy the source document.

Figure 5:
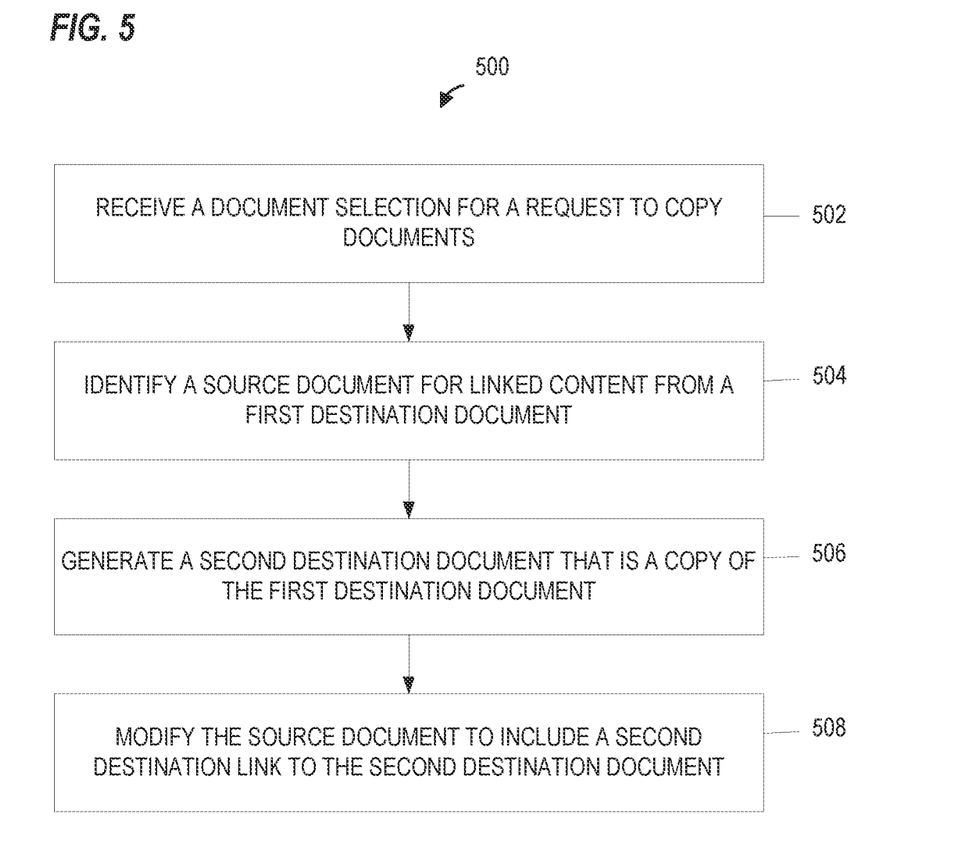
FIG. 5 is a flowchart illustrating an example method, implemented on a server, for copying selected documents, according to an embodiment.

FIG. 5 is a flowchart illustrating an example method 500, implemented on a server, for copying selected documents, according to an embodiment. In some embodiments, the method 500 is implemented by the productivity server 100 of FIG. 1, which interacts with the database server 106 and the client devices 104. FIG. 5 is described with reference to FIG. 1 for explanatory purposes. In other embodiments, however, the method 500 is implemented by another suitable computing device.

At step 502, a document selection is received from a user for a request to copy documents, in an embodiment. The document selection includes destination documents, for example, a first destination document that contains a first link to linked content. In an embodiment, for example, the document selection corresponds to the selected documents 320 (FIG. 3), the first destination document corresponds to the first document 302, and the first link corresponds to the links 314 or 316. As discussed above, the user may request the copy operation by selecting the documents and then making a selection from a menu (e.g., right-clicking a selected document to obtain a context menu or clicking a drop-down menu for the copy operation). In some embodiments, the document selection includes a plurality of destination documents where ones of the destination documents contain one or more links to linked content within a plurality of source documents. In other words, the user selects the plurality of destination documents (e.g., documents 302 and 304) and at least some of the destination documents include links to linked content in the source documents (i.e., document 302 includes links to document 304 and 306).

At step 504, a source document for the linked content is identified using the first link, in an embodiment. The source document contains a first link to the first destination document for the linked content. In an embodiment, for example, the source document corresponds to the second document 304 or the third document 306. In some embodiments, the productivity server 100 parses the destination documents to identify the links contained therein and then identifies the source documents using the links. In an embodiment, for example, the first destination document (document 302) includes a plurality of links (links 314 and 316) and the productivity server 100 parses the links 314 and 316 to identify the second document 304 and third document 306 as the plurality of source documents.

At step 506, a second destination document that is a copy of the first destination document is generated to include a second link to the linked content, in an embodiment. The second destination document corresponds to the fourth document 352 and the second link corresponds to the link 364 or 366, in an embodiment. In an embodiment, the first and second links correspond to respective elements and the source element of the first link and the source element of the second link may be the same source element within a source document. In an embodiment, for example, both the first document 302 and the fourth document 352 contain respective links (e.g., link 316 and 366) that both refer to the third document 306.

At step 508, the source document is modified to include a second link to the second destination document, in an embodiment. For example, the third document 306 is modified to include a link to the fourth document 352, or the fifth document 354 is modified to include a link to the fourth document 352. In some embodiments, steps 506 and 508 are combined and performed by a same productivity server 100. In other embodiments, steps 506 and 508 are performed separately and as a distributed process or task that is distributed among several productivity servers 100 (or other suitable devices). Moreover, in some embodiments, each of the steps 506 or 508 is distributed among several productivity servers 100. In an embodiment, at least some of the steps 506 or 508 are performed as a background process as perceived by the user that requested the copy operation.

In some embodiments, the first destination document includes a plurality of links that correspond to indirect documents, e.g., documents that will not be copied as part of the copy operation. In some embodiments, each of the indirect documents for the destination document are modified to include a respective link to the second destination document (i.e., to the copy of the first destination document).

In some embodiments, the productivity server 100 determines, for each source document, whether the source document is included within the document selection and i) copies the source document in response to the request when the source document is included within the document selection, and ii) modifies the source document to include a third (e.g., additional) link without copying the source document in response to the request when the source document is not included within the document selection. In an embodiment, for example, the first document 302 and second document 304 are within a document selection and the second document 304 and the third document 306 are source documents for the first document 302. In this embodiment, the productivity server 100 copies the second document 304 because it is within the document selection, but modifies the third document 306 (instead of copying) because it is not within the document selection.

The productivity server 100 optionally generates a linked files report that indicates link relationships among the plurality of destination documents and the plurality of source documents as part of the method 500. In an embodiment, for example, the productivity server 100 generates the linked files report 400. In some embodiments, step 504 includes identifying source documents for each destination document of the plurality of destination documents using links within the corresponding destination document. For example, the productivity server 100 identifies the source documents 434, 436, and 416 for the destination document 414 and identifies the source document 434 (Exhibit 99.1) for the destination document 416.

In an embodiment, generating the linked filed report includes determining, for each destination document of the plurality of destination documents, a respective number of links for each identified source document corresponding to the destination document. For example, the productivity server 100 determines for the document 414 the number of links (81, 20, and 22, respectively, for the source documents 434, 436, and 416. In an embodiment, the productivity server 100 identifies, within the linked files report, which source documents for a destination document were included in the document selection, for example, by grouping the source documents into groups 424 and 426. In some embodiments, the productivity server identifies total numbers of links for each destination document, for example, by group or by source document.

Figure 6:
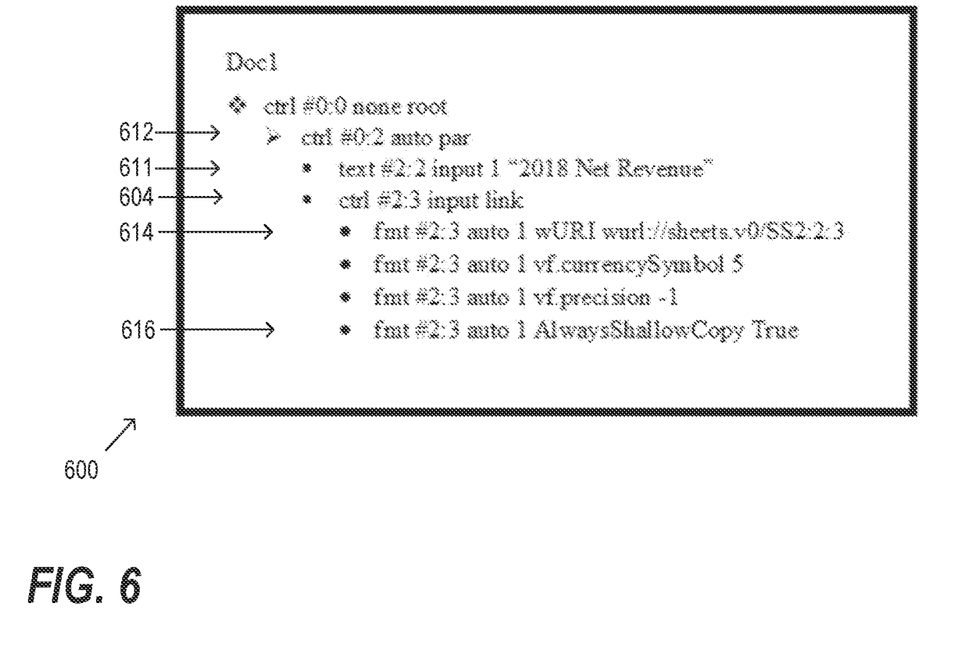
FIG. 6 is a diagram of example symbolic representations of a causal tree that includes a linking data structure, according to an embodiment.

FIG. 6 is a diagram of example symbolic representations of a causal tree 600 that includes a linking data structure, according to an embodiment. As shown in FIG. 6, the causal tree 600 corresponds to a destination document that links to a source document. In an embodiment, for example, the causal tree 600 generally corresponds to the first document 302 (Doc1), but is simplified for clarity and discussion. The causal tree 600 is itself a data structure that comprises a sequence of editing instructions associated with a particular cell or other document element. In some embodiments, each editing instruction is assigned an identifier unique to such editing instruction. For example, when the client software 105a receives a user editing instruction for a document (e.g., the document 302), the user editing instruction is assigned an identifier that is unique to the user editing instruction and the user editing instruction is stored as an additional node to the causal tree 600. In an embodiment, a set of content includes a plurality of alphanumeric characters that are collectively represented in the causal tree 600 as a single character that is replaced by the plurality of alphanumeric characters when displayed in the user interface. In the embodiment shown in FIG. 6, various editing instructions are organized as "characters" and are assigned an identifier, for example, a control character 604 ("ctrl") has an identifier "#2:3", a text character 611 has an identifier "#2:2", a control character 612 ("ctrl") has as an identifier "#0:2", and so on.

The control character 604 is a link character that corresponds to a first link, for example, the link 314, 316, 364, or 366. The control character 604 includes a uniform resource identifier (URI) 614 that identifies the source location of the linked content, and one or more formatting characters (e.g., character 616) that identify a display format of the linked content or indicate other suitable information related to the link. In other embodiments, a different resource locator is utilized, such as a uniform resource locator (URL) or other suitable link identifier. In the present disclosure, when the user 120 enters a user entry of a link in a cell, the client software 105*a* is configured to insert the URI 614, which identifies a source location of the desired set of content, into the causal tree that represents a history of edits to the cell, according to an embodiment. When inserting the URI 614 into the causal tree, the client software 105*a* is configured to insert a first linking data structure configured to identify i) the first link, ii) the set of content, and iii) a destination location within the first document at which the link is to be processed.

In some embodiments, the linking data structure is associated with an external linking system configured to monitor changes to source locations and destination locations. In an embodiment, for example, the productivity server 100 includes the external linking system and is configured to monitor changes to the source locations and destination locations. In an embodiment, when rendering a document element, data corresponding to the source location is provided to the external linking system to indicate that any changes to the associated characters (i.e., in the source document) should be provided for updating the user interface that has rendered the document. In some embodiments, the client software 105*a* receives a notice of a change to the set of content from the external linking system and automatically updates the user interface to display the change to the set of content. In an embodiment, for example, the external linking system sends the updated content directly to the client software 105*a* when the change occurs. In another embodiment, for example, the external linking system sends the notice without the updated content and the client software 105*a* subsequently sends a request for the updated content.

As described above, the user selects documents to be copied (e.g., documents 320), which may inform a decision on which documents are shallow copied or deep copied. However, this approach may be time consuming for a user to identify each document that should be shallow copied and each document that should be deep copied. In some scenarios, data stored within a document (or the document itself) is associated with one or more intrinsic properties that are useful to determine whether that document (or another document that links to or is linked from the document) should be shallow copied or deep copied. As used herein, "intrinsic" properties are those properties used for a purpose other than explicitly indicating whether a document should be shallow copied or deep copied. In various embodiments, the intrinsic properties may be used to identify a reporting period associated with a document that has been published, an entity jurisdiction for a document, an entity name, or other features or flags associated with a document.

In some embodiments, the productivity server 100 is configured to automatically determine which documents within a selection (or other documents associated with the selection) are to be shallow copied or deep copied based on at least some of the intrinsic properties. In various embodiments, the intrinsic properties are attributes, variables, metadata, or other data that is associated with a document, file, container, or workspace. In some embodiments, an intrinsic property is shared among multiple documents, files, or containers.

The intrinsic properties may be stored or managed in different locations. In various embodiments, for example, the properties are stored as a flag within a file system, as a value within a file (e.g., values in a spreadsheet), as key/value pairs within a document or database, or in any other suitable manner. In an embodiment, a key/value pair is stored within (or with) a file or document. As one example of an intrinsic property, an "Archived" flag indicates whether a document has been archived (e.g., having a "true" value that indicates it has been archived, no longer part of an active process, and should not be modified again). As another example, a file with a "RollForward" flag having a value of "false" could indicate that links originating from source elements in that file should be preserved as-is (i.e. Shallow Copy), instead of creating a duplicate of the file and creating new source elements. In some scenarios, the RollForward flag is used for a document related to quarterly financials and indicates whether a document should be copied from one quarter to the next (e.g., having a "true" value that indicates a document should be copied and "rolled forward" to the following financial quarter).

In various embodiments, the productivity server 100 is configured to automatically determine which documents are to be shallow copied or deep copied based on at least some of the intrinsic properties, for example, when the intrinsic properties indicate that the linked content is static. In an embodiment, the productivity server 100 is configured to automatically select a shallow copy for a document where RollForward is false. For example, "RollForward=False" could indicate that links originating from source elements in that file should be preserved as-is (i.e. shallow copy), instead of creating a duplicate of the file and creating new source elements. In another embodiment, the productivity server 100 is configured to automatically select a shallow copy for a document where Archived is true and thus the linked content is static. In yet another embodiment, the productivity server 100 is configured to automatically select a shallow copy when a variable exceeds a threshold, for example, when a number of source links that link to a source document reaches 10, 200, or other suitable number of links. In some scenarios, shallow copying the document avoids additional copies that may be relied upon by many different destination documents and simplifies managing the linked content.

In some embodiments, the productivity server 100 makes a selection of a shallow copy or deep copy for a selected document based on all of the source links for the selected document. In an embodiment, for example, where a plurality of destination documents (e.g., documents 304 and 306 contain respective links to various content that is located within a source document (e.g., document 302), the productivity server 100 determines whether to shallow copy or deep copy the source document based on properties of the respective links from the destination documents, even when some of those destination documents (e.g., document 306)

are not included within the selected documents 320. In other words, when one destination document links to the source document and requires that the source document be deep copied, the source document is deep copied even when the destination document is not part of the selected documents 320.

Some documents, such as the spreadsheet documents 304 and 306, may contain formulas that use values linked from other source documents. In some embodiments, when a cell within a destination document contains a formula, the productivity server 100 is configured to consider the variables within the formulas and/or the documents from which the variables are linked to determine whether to shallow copy or deep copy the destination document. In an embodiment, for example, when a selected destination document contains a formula that references a source document having the Archived flag set to True (corresponding to a shallow copy), the productivity server 100 is configured to shallow copy the source document.

When multiple intrinsic properties associated with a file correspond to different copy modes, the productivity server 100 may be configured to use a default copy mode, in some embodiments. In an embodiment, for example, the productivity server 100 uses a shallow copy mode as a default, but uses a deep copy mode when one or more intrinsic properties correspond to the deep copy mode, even when other intrinsic properties correspond to the shallow copy mode. In other embodiments, the productivity server 100 uses the deep copy mode as the default mode.

The intrinsic properties associated with a file may be explicitly managed by a user in some embodiments. For example, the user may manually create, modify, or remove flags or variables associated with a file, folder, or container that are utilized by the productivity server 100 to determine whether to shallow copy or deep copy the corresponding file, folder, or container. In some embodiments, the flags and/or variables are modified automatically by other processes performed by the productivity server 100 or other suitable device, for example, a publishing process or Securities Exchange Commission (SEC) filing process that sets an Archive flag to "true" after a publication or filing. In one such example, an SEC quarterly report for Q1 is archived after it has been filed with the SEC.

In some embodiments, the intrinsic property is a flag or variable associated with a link itself. In the embodiment shown in FIG. 6, for example, the link 604 within the destination document includes a formatting character 616 that sets an "AlwaysShallowCopy" flag to True so that the source document identified by the URI 614 is always shallow copied when the destination document containing the link 604 is part of the selected documents 320.

Content that is associated with a link may provide guidance for determining whether to shallow copy or deep copy a document. In other words, the intrinsic property is content within the document itself. In an embodiment, the productivity server 100 is configured to use content located adjacent to a link to determine whether to shallow copy or deep copy a document, for example, text or cells that are displayed adjacent to the linked content. As one such example, the productivity server 100 may analyze the text character 611 ("2018 Net Revenue") and determine that the source document should be shallow copied due to its age (i.e., more than one year old or another suitable threshold) or some other trait that suggests the value is unlikely to be changed (i.e., static).

In some embodiments, the productivity server 100 is configured to designate a document as a template from which additional documents may be created. In an embodiment, the status of a document as being a template is an intrinsic property that indicates to the productivity server 100 that the document should be shallow copied. For example, a master spreadsheet or master presentation may be designated as a file that should not be deep copied. In other embodiments, a document is designated with one or more roles that indicate to the productivity server 100 that the document should be shallow copied. For example, when a role is one of a parent, child, grandparent, root, or other role that establishes a hierarchy, a top-level role (e.g., grandparent or root) may correspond to a shallow copy while a low-level role that depends from another role may correspond to a deep copy (or vice versa). As another example, a reference, definition, or other designation for content that is generally static in nature may indicate a role for a document that should be shallow copied (i.e., to avoid multiple copies of a definition or reference guide).

Figure 7:
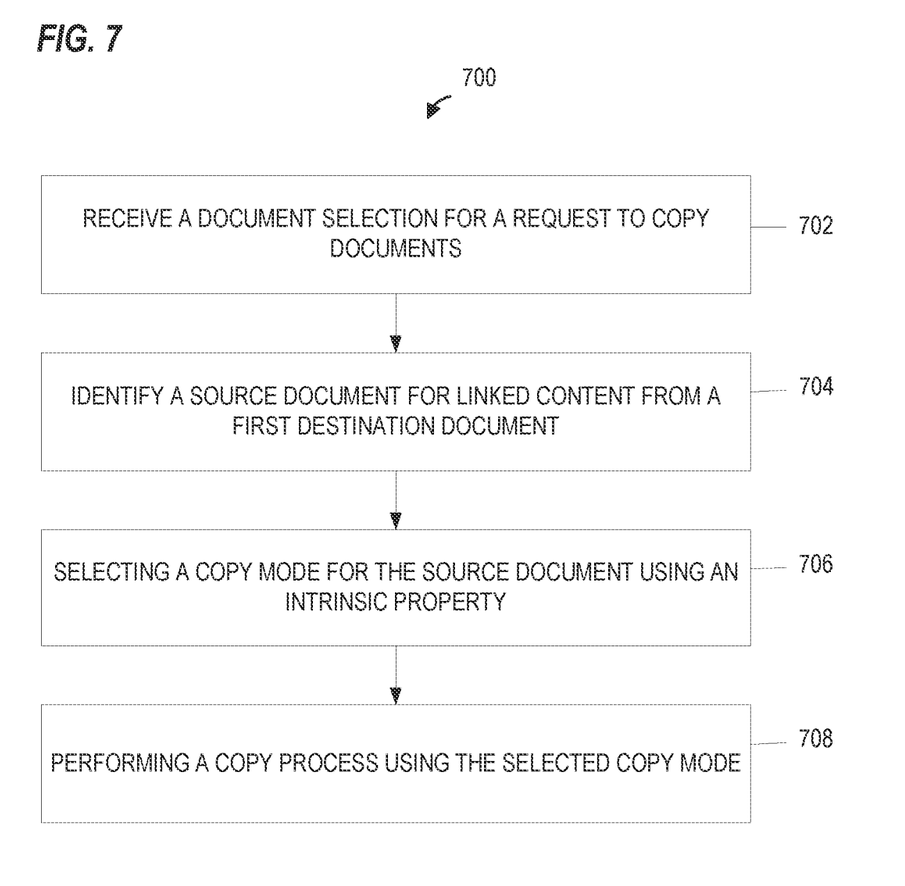
FIG. 7 is a flowchart illustrating an example method, implemented on a server, for maintaining links for a document workspace, according to an embodiment.

FIG. 7 is a flowchart illustrating an example method 700, implemented on a server, for copying selected documents, according to an embodiment. In some embodiments, the method 700 is implemented by the productivity server 100 of FIG. 1, which interacts with the database server 106 and the client devices 104. FIG. 7 is described with reference to FIG. 1 for explanatory purposes. In other embodiments, however, the method 700 is implemented by another suitable computing device.

At step 702, a document selection is received from a user for a request to copy documents, in an embodiment. This step is analogous to step 502 of FIG. 5, in some embodiments.

At step 704, a source document for the linked content is identified using the first link, in an embodiment. This step is analogous to step 704 of FIG. 5, in some embodiments.

At step 706, a copy mode for the source document is selected using an intrinsic property associated with the first link, in an embodiment. The copy mode is selected from a first copy mode and a second copy mode. The first copy mode is a copy mode where a second destination document that is a copy of the first destination document is generated and includes a second link to the linked content within the first source document, without copying the first source document. The second copy mode is a copy mode where i) a second source document that is a copy of the first source document is generated, ii) the second destination document that is the copy of the first destination document is generated and includes a second link to the linked content within the second source document. In an embodiment, the first copy mode is a shallow copy mode and the second copy mode is a deep copy mode, as described above.

At step 708, a copy operation is performed in response to the request to copy documents using the selected copy mode, in an embodiment. When the first copy mode (shallow copy mode) is selected in step 706, after performing the copy using the first copy mode, a source element of the first link and a source element of the second link are the same source element within the first source document. In an embodiment for example, the first link and the second link correspond to the links 316 and 366, respectively.

In some embodiments, the intrinsic property associated with the first link is displayed content associated with the first link and selecting the copy mode at step 706 comprises selecting the first copy mode when the displayed content indicates that the linked content is static. In an embodiment, for example, the productivity server 100 analyzes the text character 611 ("2018 Net Revenue") as the displayed content and determines that the source document should be shallow copied due to its age (i.e., more than one year old or another suitable threshold) or some other trait that suggests the value is unlikely to be changed (i.e., static). In other words, the displayed content indicates a date associated with the linked content and the first copy mode is selected when an age of the linked content based on the date associated with the linked content exceeds a predetermined threshold.

In another embodiment, the productivity server 100 analyzes a text character (not shown) in the corresponding source document instead of (or in addition to) the text character 611 to select the copy mode. Notably, the displayed content (e.g., text character 611) is distinct from the linked content. In an embodiment, the displayed content may be located within the first source document adjacent to a display location of the linked content within the first source document.

In some embodiments, the intrinsic property associated with the first link is a flag associated with one of the first source document or the first destination document, where the flag indicates whether the linked content is static. The productivity server 100 selects the first copy mode when the flag indicates that the linked content is static. Examples of flags are described above, for example, the Archived flag, RollForward flag, or other suitable flag.

In an embodiment, the first destination document includes a plurality of links to the first source document and ones of the plurality of links are associated with one or more respective intrinsic properties. In other words, the first document 302 includes many different instances of the link 316 to the third document 306. In this embodiment, selecting the copy mode comprises using the second copy mode as a default copy mode and selecting the first copy mode when one of the one or more respective intrinsic properties of the ones of the plurality of links indicates that the corresponding linked content is static. In other words, when at least one of the links to the third document 306 indicates that the linked content is static, the productivity server 100 selects the shallow copy mode.

In another embodiment, the first source document contains linked content that is linked from a plurality of destination documents having respective links to the linked content. The plurality of destination documents including the first destination document that is contained within the document selection and a second destination document that is not contained within the document selection. Ones of the respective links are associated with one or more respective intrinsic properties. Selecting the copy mode comprises using the second copy mode as a default copy mode and selecting the first copy mode when one of the one or more respective intrinsic properties of the ones of the respective links indicates that the corresponding linked content is static. As an example, the third document 306 shown in FIG. 3B contains linked content that is linked from a plurality of destination documents, i.e., the first document 302 and the fourth document 352.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art. The terminology used herein is for the purpose of describing the particular embodiments and is not intended to be limiting of exemplary embodiments of the disclosure. In the description of the embodiments, certain detailed explanations of related art are omitted when it is deemed that they may unnecessarily obscure the essence of the disclosure.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, solid state drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the disclosure pertains may easily implement functional programs, codes, and code segments for making and using the disclosure.

The disclosure may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the disclosure may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the disclosure and does not pose a limitation on the scope of the disclosure unless otherwise claimed. Numerous modifications and adaptations will be readily apparent to those of ordinary skill in this art without departing from the spirit and scope of the disclosure as defined by the following claims. Therefore, the scope of the disclosure is defined not by the detailed description of the disclosure but by the following claims, and all differences within the scope will be construed as being included in the disclosure.

No item or component is essential to the practice of the disclosure unless the element is specifically described as "essential" or "critical". It will also be recognized that the terms "comprises", "comprising", "includes", "including", "has", and "having", as used herein, are specifically intended to be read as open-ended terms of art. The use of the terms "a" and "an" and "the" and similar referents in the context of describing the disclosure (especially in the context of the following claims) are to be construed to cover both the singular and the plural, unless the context clearly indicates otherwise. In addition, it should be understood that although the terms "first", "second", etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method for maintaining links for a document workspace, the method carried out by one or more computing devices and comprising:
   receiving, from a user device, a document selection for a request to copy documents, wherein the document selection includes a first destination document that contains a first link to linked content;
   identifying a first source document that contains the linked content using the first link, wherein the first source document is not contained within the document selection;
   selecting a copy mode for the first source document using an intrinsic property associated with a first source location of the first source document, the copy mode being selected from:
      a first copy mode where a second destination document that is a copy of the first destination document is generated and includes a second link to the linked content within the first source document, without copying the first source document, and
      a second copy mode where i) a second source document that is a copy of the first source document is generated, ii) the second destination document that is the copy of the first destination document is generated and includes a second link to the linked content within the second source document; and
   performing a copy process in response to the request to copy documents using the selected copy mode.

2. The method of claim 1, wherein selecting the copy mode comprises using the second copy mode as a default copy mode and selecting the first copy mode when the intrinsic property associated with the first source location is a flag indicating that documents at the first source location are static.

3. The method of claim 1, wherein selecting the copy mode comprises using a default copy mode of the first and second copy modes and selecting a non-default copy mode when the intrinsic property associated with the first source location is one or more of metadata, a flag, or a property that indicates a relative location between the first source document and a third destination document corresponding to the non-default copy mode.

4. The method of claim 3, wherein the relative location is a location within a hierarchy of documents that corresponds to the non-default copy mode.

5. The method of claim 3, wherein the relative location is one of a parent location or a child location that corresponds to the non-default copy mode.

6. The method of claim 3, wherein the relative location designates the first source document as a template corresponding to the non-default copy mode.

7. The method of claim 3, wherein the relative location designates the first source document as static content corresponding to the non-default copy mode.

8. The method of claim 1, wherein selecting the copy mode comprises using a default copy mode of the first and second copy modes and selecting a non-default copy mode when the intrinsic property associated with the first source location is one or more of metadata, a flag, or a property that indicates a relative location between the first source location and another location corresponding to the non-default copy mode.

9. A method for maintaining links for a document workspace, the method carried out by one or more computing devices and comprising:
   receiving, from a user device, a document selection for a request to copy documents, wherein the document selection includes a first destination document that contains a first link to linked content;
   identifying a first source document that contains the linked content using the first link, wherein the first source document is not contained within the document selection and the linked content is linked to a plurality of destination documents having respective links to the linked content, the plurality of destination documents including the first destination document that is contained within the document selection and a second destination document that is not contained within the document selection;
   selecting a copy mode for the first source document using an intrinsic property associated with the second destination document, the copy mode being selected from:
      a first copy mode where a second destination document that is a copy of the first destination document is generated and includes a second link to the linked content within the first source document, without copying the first source document, and
      a second copy mode where i) a second source document that is a copy of the first source document is generated, ii) the second destination document that is the copy of the first destination document is generated and includes a second link to the linked content within the second source document; and
   performing a copy process in response to the request to copy documents using the selected copy mode.

10. The method of claim 9, wherein selecting the copy mode comprises using a default copy mode of the first and second copy modes and selecting a non-default copy mode based on a number of the plurality of destination documents.

11. The method of claim 9, wherein selecting the copy mode comprises using a default copy mode of the first and second copy modes and selecting a non-default copy mode based on one or more of metadata, a flag, or a property of another document of the plurality of destination documents.

12. The method of claim 11, wherein the metadata, the flag, or the property of the other document of the plurality of destination documents indicates that the first source document is a template.

13. The method of claim 11, wherein the metadata, the flag, or the property of the other document of the plurality of destination documents indicates that the first source document is a root of a hierarchy of documents.

14. The method of claim 11, wherein the metadata, the flag, or the property of the other document of the plurality of destination documents indicates that the first source document is a static document.

15. A non-transient computer-readable storage medium comprising instructions being executable by one or more processors, that when executed by the one or more processors, cause the one or more processors to:
receive, from a user device, a document selection for a request to copy documents, wherein the document selection includes a first destination document that contains a first link to linked content;
identify a first source document that contains the linked content using the first link, wherein the first source document is not contained within the document selection;
select a copy mode for the first source document using an intrinsic property associated with the first link, the copy mode being selected from:
a first copy mode where a second destination document that is a copy of the first destination document is generated and includes a second link to the linked content within the first source document, without copying the first source document, and
a second copy mode where i) a second source document that is a copy of the first source document is generated, ii) the second destination document that is the copy of the first destination document is gener-
ated and includes a second link to the linked content within the second source document; and
perform a copy process in response to the request to copy documents using the selected copy mode.

16. The computer-readable storage medium of claim 15, wherein the instructions are executable by the one or more processors to cause the one or more processors to:
use the second copy mode as a default copy mode; and
select the first copy mode when the intrinsic property associated with the first source location is a flag indicating that documents at the first source location are static.

17. The computer-readable storage medium of claim 15, wherein the instructions are executable by the one or more processors to cause the one or more processors to:
use a default copy mode of the first and second copy modes; and
select a non-default copy mode when the intrinsic property associated with the first source location is one or more of metadata, a flag, or a property that indicates a relative location between the first source document and a third destination document corresponding to the non-default copy mode.

18. The computer-readable storage medium of claim 17, wherein the relative location is a location within a hierarchy of documents that corresponds to the non-default copy mode.

19. The computer-readable storage medium of claim 17, wherein the relative location designates the first source document as a template corresponding to the non-default copy mode.

20. The computer-readable storage medium of claim 15, wherein the instructions are executable by the one or more processors to cause the one or more processors to:
use a default copy mode of the first and second copy modes; and
select a non-default copy mode when the intrinsic property associated with the first source location is one or more of metadata, a flag, or a property that indicates a relative location between the first source location and another location corresponding to the non-default copy mode.

\* \* \* \* \*